(12) United States Patent
Czimmek et al.

(10) Patent No.: US 9,212,591 B2
(45) Date of Patent: Dec. 15, 2015

(54) USING RESISTANCE EQUIVALENT TO ESTIMATE HEATER TEMPERATURE OF AN EXHAUST GAS AFTER-TREATMENT COMPONENT

(71) Applicant: Continental Automotive Systems, Inc., Auburn Hills, MI (US)

(72) Inventors: Perry Robert Czimmek, Williamsburg, VA (US); Michael Joseph Hornby, Williamsburg, VA (US); Douglas Edward Cosby, Yorktown, VA (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 103 days.

(21) Appl. No.: 14/134,931

(22) Filed: Dec. 19, 2013

(65) Prior Publication Data

US 2014/0182272 A1    Jul. 3, 2014

Related U.S. Application Data

(60) Provisional application No. 61/747,529, filed on Dec. 31, 2012.

(51) Int. Cl.
*G01R 27/08* (2006.01)
*F01N 9/00* (2006.01)
*F01N 3/20* (2006.01)

(52) U.S. Cl.
CPC .............. *F01N 9/005* (2013.01); *F01N 3/2013* (2013.01); *F01N 9/00* (2013.01); *F01N 2900/0601* (2013.01); *F01N 2900/0602* (2013.01); *Y02T 10/26* (2013.01); *Y02T 10/47* (2013.01)

(58) Field of Classification Search
USPC ............... 324/713; 166/302, 60, 250.01, 248, 166/65.1, 272.1, 61; 219/497, 542; 60/286, 60/300, 303, 299; 405/131; 123/549, 123/179.6, 435, 543
See application file for complete search history.

(56) References Cited

U.S. PATENT DOCUMENTS

| | | | | |
|---|---|---|---|---|
| 5,614,089 | A | * | 3/1997 | Allington et al. .......... 210/198.2 |
| 5,904,902 | A | * | 5/1999 | Matuoka et al. ............ 422/174 |
| 7,444,230 | B2 | * | 10/2008 | Cheiky ......................... 701/106 |
| 2003/0039299 | A1 | * | 2/2003 | Horovitz et al. ............. 374/141 |
| 2010/0219327 | A1 | * | 9/2010 | Arbore et al. ................. 250/206 |
| 2011/0270568 | A1 | | 11/2011 | Hirai et al. |
| 2011/0276252 | A1 | | 11/2011 | Kabasin et al. |

FOREIGN PATENT DOCUMENTS

WO    2012/089707 A2    7/2012
WO    2013/060630 A    5/2013

OTHER PUBLICATIONS

Search Report dated Aug. 12, 2013, from corresponding GB Patent Application No. GB1303321.2.

* cited by examiner

*Primary Examiner* — Melissa Koval
*Assistant Examiner* — Nasima Monsur

(57) ABSTRACT

A temperature of a heated component is determined for control and monitoring. The heater driver, upon receipt of a turn-on signal, generates a current within a component of an electronic catalyst or exhaust after-treatment component, wherein the current through the component generates an appropriate loss to generate heat for facilitation of an exhaust after-treatment process. The heater driver regulates the energy to the heated component based on the electrical resistance of that component as a function of temperature and a predetermined reference value for that temperature.

8 Claims, 1 Drawing Sheet

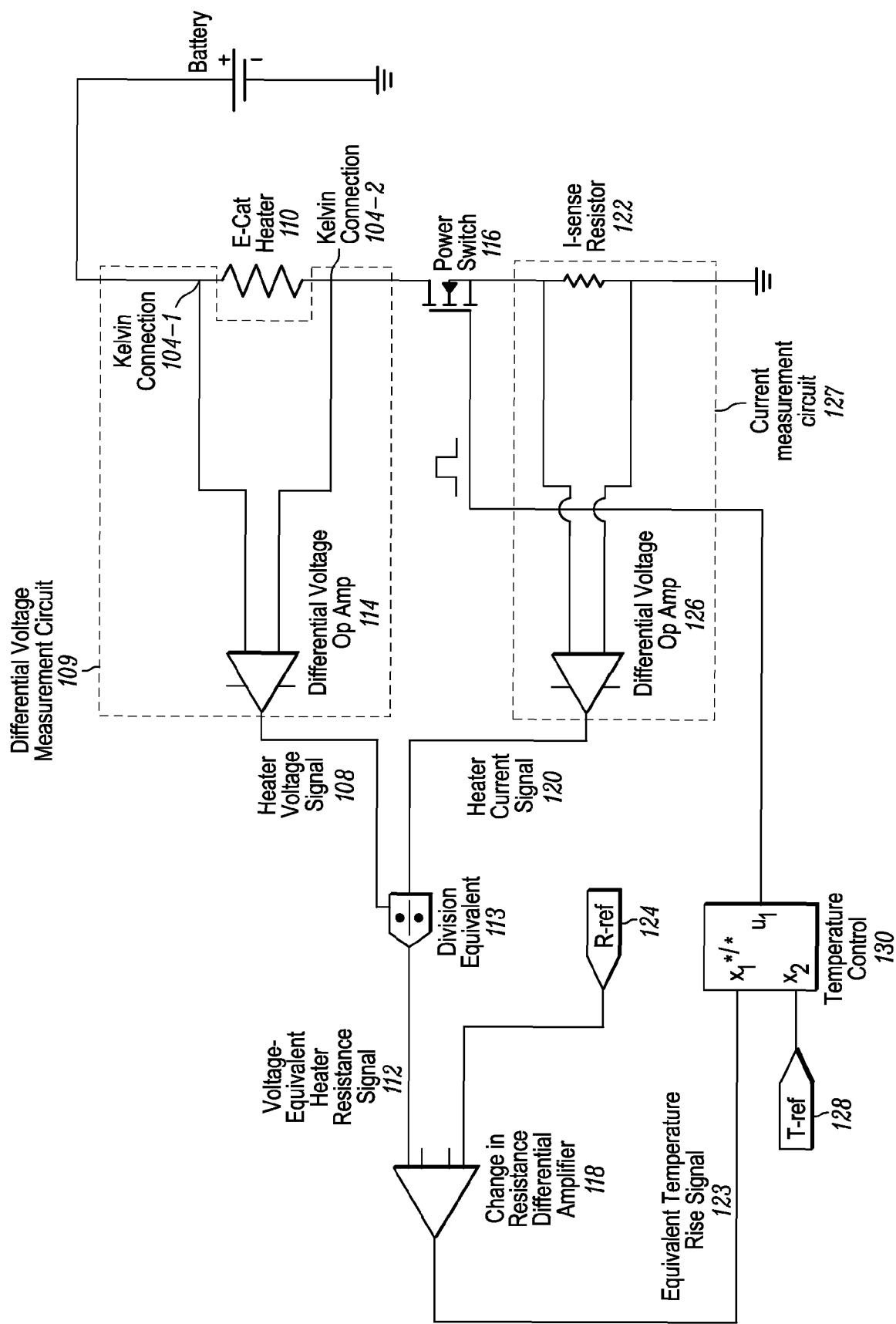

USING RESISTANCE EQUIVALENT TO ESTIMATE HEATER TEMPERATURE OF AN EXHAUST GAS AFTER-TREATMENT COMPONENT

CROSS-REFERENCE TO RELATED APPLICATIONS

This application is related to the following 5 U.S. provisional patent applications:

Using Resistance Equivalent to Estimate Temperature of a Fuel-Injector Heater, invented by Perry Czimmek, Mike Hornby, and Doug Cosby, filed on the same day as this provisional patent application, and identified by Ser. No. 61/747,474.

Tuned Power Amplifier With Loaded Choke For Inductively Heated Fuel Injector, invented by Perry Czimmek, filed on the same day as this provisional patent application, and identified by Ser. No. 61/747,501.

Tuned Power Amplifier with Multiple Loaded Chokes for Inductively Heated Fuel Injectors, invented by Perry Czimmek, filed on the same day as this provisional patent application, and identified by Ser. No. 61/747,511.

Resistance Determination For Temperature Control Of Heated Automotive Components, invented by Perry Czimmek, filed on the same day as this provisional patent application, and identified by Ser. No. 61/747,544.

Resistance Determination with Increased Sensitivity for Temperature Control of Heated Automotive Component, invented by Perry Czimmek, filed on the same day as this provisional patent application, and identified by Ser. No. 61/747,559.

BACKGROUND

Embodiments of the invention relate generally to power electronics for exhaust after-treatment component heaters and more particularly to power electronics for control and monitoring of electronic catalysts and decomposition elements associated with reductant delivery exhaust after-treatment.

There is a continued need for improving the emissions quality of internal combustion engines. At the same time, there is pressure to have improved emissions while having a maximum of fuel economy. Those pressures apply to engines fueled with gasoline, diesel, natural gas, or with any other alternative fuels such as hydrogen, ethanol, or additional biofuels.

Dividing the types of components into three distinct categories serves to simplify the explanation of the locations for an exhaust after-treatment heater. The three types of components are: the 3-way catalyst, the particulate filter, and the reductant decomposition tube. The 3-way catalyst combines the undesirable hydrocarbon and carbon monoxide emissions with excess oxygen in the exhaust stream and catalyzes an oxidation reaction where water and carbon dioxide are the output. Further, a reduction reaction occurs where nitrogen oxides, or NOx emissions, are reduced to nitrogen and oxygen. Historical 3-way catalyst systems enrich the combustion such that the combustion continues at a low level inside the exhaust system to more quickly raise the temperature of the catalyst, typically referred to as "catalyst light-off."

The particulate filter, for diesels is the Diesel Particulate Filter ("DPF"). This component is a filter that traps carbon particulates or soot. The filter "loads up" with the particles that are being trapped because the filter's pores are smaller than the particles. Eventually, the back-pressure caused by a loaded filter flags the regeneration of this filter. The regeneration is accomplished by heating the filter material, typically ceramic, to such a high temperature that the carbon particulates burn off in the presence of excess oxygen. This heating is typically accomplished by enriching the exhaust with unburned fuel that then burns at the filter, thereby heating it.

The reductant decomposition tube is where urea-water solution is added by a Reductant Delivery Unit ("RDU") to the exhaust stream. This urea-water solution aids in Selective Catalyst Reduction ("SCR") by decomposition of the urea into ammonia and water. This ammonia then reduces nitrogen oxides into diatomic nitrogen and water. Typically, hot exhaust gas is expected to decompose the urea into ammonia and water inside the decomposition tube. This is, however, not always efficient as urea decomposes over a narrow temperature range into ammonia and water, and more frequently decomposes in additional reactions to deposits that do not contribute to SCR.

During engine cold start, the enrichment necessary to accomplish the start leaves an off-stoichiometric fueling that materializes as high tail-pipe hydrocarbon emissions, due, at least in part, to cold exhaust after-treatment components. The worst emissions are during the first few minutes of engine operation, after which the catalyst, other exhaust components and engine approach operating temperature.

A number of pre-heating methods have been proposed, most of which involve additional combustion products to be made. The fastest method to heat a catalyst, decomposition element, or particulate filter is directly with electrical power. Electrical energy is converted to heat inside a component suitable in geometry and material to be heated by the Joule or Ohm losses that are caused by the flow of current through that component. As such, it is desirable to know the temperature of the heater and to control that temperature.

Because the heating technique uses an electrical current, the system includes electronics for providing an appropriate excitation to the component in the exhaust system. This excitation may include controlling the electrical energy and determining when that electrical energy is applied.

Conventional resistive heating is accomplished open-loop, or without control of electrical energy based on a temperature. A remote thermostat or computational model may be incorporated to provide some control to prevent a runaway temperature event and some level of control. More sophisticated methods may monitor the current through the heater to estimate the temperature or direct thermocouple, positive/negative temperature coefficient sensor, or other means for determining the temperature for a more precise regulation of component temperature.

The metallic component that is heated will have a positive temperature coefficient of resistance to electrical current (i.e., its electrical resistance will increase as its temperature increases). Ideally, knowing the initial resistance and final resistance would allow the temperature of the component to be known with some degree of precision. The best metals for resistive heaters usually have very small positive temperature coefficients and therefore measurement of the change in resistance by only monitoring current will be desensitized by harness resistance and aging of numerous interconnecting components. Additionally, electronic catalysts, or E-cats, are made of stainless steel and also suffer from a small temperature coefficient of the material. Therefore, it becomes difficult to distinguish a change in resistance of the heater component from a change in resistance of other components connected in series.

It would be advantageous to more precisely know the resistance change of the heater component such that control of the temperature may be accomplished.

BRIEF SUMMARY

A temperature of a heated component is determined for control and monitoring. The heater driver, upon receipt of a turn-on signal, generates a current within a component of an electronic catalyst or exhaust after-treatment component, wherein the current through the component generates an appropriate loss to generate heat for facilitation of an exhaust after-treatment process. The heater driver regulates the energy to the heated component based on the electrical resistance of that component as a function of temperature and a predetermined reference value for that temperature.

BRIEF DESCRIPTION OF THE DRAWINGS

FIG. 1 depicts a system in accordance with embodiments of the invention.

DETAILED DESCRIPTION

Embodiments of the invention are directed to determining a temperature of a heater component in an exhaust after-treatment component. Current may be measured by precisely measuring a voltage drop across a small value precision resistor inside an electronics assembly, or "current-sense resistor." This voltage drop is directly proportional to the current flowing through the resistor. Knowledge of this current may then be expanded upon by a precise measurement of voltage across the heater component. With the current through the heater known and the voltage across the heater known, from Ohm's Law, the resistance may be calculated in accordance with the well-known formula $R=V/I$, where R is resistance, V is voltage, and I is current. Embodiments of the invention use this resistance knowledge to estimate a temperature of the heated component and to regulate the temperature of the heated component based on this estimate.

Referring to FIG. 1, an electronic catalyst ("E-Cat") heater 110 references the heated component of which a resistance, as a function of temperature, is to be determined. An I-sense resistor differential voltage, also referred to as heater current signal 120, represents the electrical current through the I-sense resistor 122 and, therefore, through the E-Cat heater 110. A current measurement circuit 127 comprises the I-sense resistor 122 and a differential voltage operational amplifier 126. A current sense resistor may be used either on the high side or the low side of the power switch or the load. Current measurement may be done with a hall sensor or with other types of magnetic sensors, such as sense coils.

A differential voltage across the E-Cat heater, also referred to as heater voltage signal 108, represents the excitation voltage directly related to the current flowing through the E-Cat heater. The two differential voltages are solved for Ohm's Law relation, $R=V/I$, using an analog or digital division equivalent 113, to provide a result as a voltage-equivalent heater resistance signal 112. The analog or digital division equivalent 113 may be implemented in accordance with conventional techniques, which are known in the art, by combining operations and components including, but not limited to: summing and shift registers in digital solutions; and logarithmic, sum or difference, and antilogarithm amplification in analog solutions. The change in resistance differential amplifier 118 then finds a difference between the voltage-equivalent heater resistance signal 112 and a resistance reference value, R-ref 124. This generates a delta, or change in resistance, or error, signal that may be brought in as an equivalent temperature rise signal 123 to a temperature control module 130. This equivalent temperature rise signal 123 may be integrated over time, which may be performed computationally or through an analog conversion to perform the integration function, and may be compared to a temperature reference, T-ref 128. The temperature control module 130 may use this comparison to determine if power should be removed from the E-Cat heater by turning off the power switch 116, represented by a MOSFET in FIG. 1 for this example. The temperature control module 130 may be: a microcontroller, a digital "thermostat", a PID (Proportional Integral Derivative) controller, or any interface that uses the change in temperature (that is represented by the equivalent temperature rise signal) integrated and compared to a target change in temperature, absolute temperature, or some other temperature reference. If the equivalent temperature rise signal 123 is too high, the temperature change is too great, so the power switch 116 may be de-energized thereby turning off the E-Cat heater 110. A cool-down model may then be used to determine when to turn the heater on again. Or if a continuous set point control strategy is used, then the power switch may be turned on and off rapidly (or operated in a linear region like an analog audio amplifier) to regulate the temperature to a target temperature by repeatedly adjusting heater power.

The differential voltage across the E-Cat heater 110 may be obtained by a differential voltage measurement circuit 109, which may comprise a differential voltage operational amplifier 114 and a pair of Kelvin connections 104-1 and 104-2 to the heater as close to the actual heater electrical connections as possible. The pair of Kelvin connections refers to the junction where force and sense connections are made. The force component is a high current carrying conductor and the sense component is a parallel wire for obtaining a voltage potential at that connection. There are two Kelvin connections such that one conductor pair carries the current of the E-Cat heater, and the other conductor pair is used for obtaining the voltage potential. The two pairs of wires may be of different size, with the current carrying pair of an appropriate size to minimize loss, and the voltage potential pair any reasonably small size for the measurement. In this way, these two pairs of wires may be used, in accordance with embodiments of the invention, to perform a four wire measurement.

To measure the differential voltage, the load or heater may be one leg of a Wheatstone bridge that is balanced. And then any change in the load would result in an unbalance of the Wheatstone bridge, and, therefore, a different voltage across the load. Or a resistance divider may be located locally at the heater or load. And then the voltage from the resistance divider may be brought back to the electronics for interpretation.

In sum, in accordance with embodiments of the invention, heater resistance may be determined by dividing differential voltage across the heater, measured close to the heater, by the current through the heater. And the equivalent resistance value may be used to control the heater temperature based on a resistance change due to temperature.

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. For example, while FIG. 1 depicts a low side semiconductor switch and a low side current sense resistor, other embodiments may use a high side semiconductor switch or high side current sense resistor or any combination thereof as understood by those skilled in the art. It is to be understood that the embodiments shown and described herein are only illustrative of embodiments of the invention and that various modifications may be implemented by those skilled in the art without departing from the scope and spirit of the invention.

The invention claimed is:

1. A method comprising:
   differentially measuring a voltage drop across an electronic-catalyst heater of an exhaust gas after-treatment component;
   measuring an amount of electrical current passing through the electronic-catalyst heater;
   generating a voltage equivalent heater resistance signal, by determining a division equivalent of dividing the differentially measured voltage drop across the electronic-catalyst heater by the measured amount of electrical current passing through the electronic-catalyst heater;
   comparing the voltage equivalent heater resistance signal to a resistance reference value signal to generate an equivalent temperature rise signal;
   integrating the equivalent temperature rise signal over time;
   comparing the equivalent temperature rise signal integrated over time to a temperature reference value to generate a temperature control signal, which is configured to turn off the electronic-catalyst heater when the comparison of the equivalent temperature rise signal integrated over time to the temperature reference value indicates that the electronic-catalyst heater is hotter than a threshold temperature.

2. The method of claim 1, wherein differentially measuring the voltage drop across the electronic-catalyst heater further comprises using a pair of Kelvin connections to measure the voltage drop across the electronic-catalyst heater.

3. The method of claim 1, wherein measuring the amount of electrical current passing through the electronic-catalyst heater further comprises using a current sense resistor to measure the amount of electrical current passing through the electronic-catalyst heater.

4. The method of claim 1, wherein the voltage equivalent heater resistance is used as a temperature analog for control of the temperature of the electronic-catalyst heater.

5. Apparatus comprising:
   a differential voltage measurement circuit configured to differentially measure a voltage drop across an electronic-catalyst heater of an exhaust gas after-treatment component;
   a current measurement circuit configured to measure current passing through the electronic-catalyst heater;
   a division equivalent circuit configured to generate a voltage equivalent heater resistance signal by performing a division equivalent of dividing the measured voltage drop across the electronic-catalyst heater by the measured current passing through the electronic-catalyst heater;
   a change in resistance differential amplifier, configured to determine a difference between a voltage equivalent heater resistance and a reference resistance value and produce from said difference an equivalent temperature rise signal;
   a temperature control module, configured to receive an integration of the equivalent temperature rise signal over time and to additionally receive a reference temperature signal and determine from a comparison of the integration of the equivalent temperature rise signal over time to the reference temperature signal, an electronic-catalyst heater control signal.

6. The apparatus of claim 5, wherein the differential voltage measurement circuit comprises a pair of Kelvin connections.

7. The apparatus of claim 5, wherein current measurement circuit comprises a current sense resistor.

8. The apparatus of claim 5, wherein electronic-catalyst control signal indicates that the electronic-catalyst heater is hotter than a threshold temperature.

* * * * *